United States Patent [19]

Kitaoh et al.

[11] Patent Number: 4,871,589

[45] Date of Patent: Oct. 3, 1989

[54] METHOD OF COATING A GOLF BALL

[75] Inventors: Katsutoshi Kitaoh, Kobe; Akihiko Hamada, Kakogawa, both of Japan

[73] Assignee: Sumitomo Rubber Industries, Ltd., Hyogo, Japan

[21] Appl. No.: 248,353

[22] Filed: Sep. 23, 1988

[30] Foreign Application Priority Data

Sep. 26, 1987 [JP] Japan ................................. 62-241572

[51] Int. Cl.$^4$ ........................ A63B 37/12; B05D 3/00; B05D 3/12
[52] U.S. Cl. ............................... 427/322; 273/235 A; 273/DIG. 22; 427/407.1
[58] Field of Search ................... 273/235 A, DIG. 22; 427/322, 407.1

[56] References Cited

U.S. PATENT DOCUMENTS 4,679,794  7/1987  Yamada et al. ................. 273/235 R
4,802,674  2/1989  Kitaoh ............................ 273/235 A

*Primary Examiner*—Michael Lusignan
*Attorney, Agent, or Firm*—Birch, Stewart, Kolasch & Birch

[57] ABSTRACT

Disclosed is a method of coating a golf ball comprising coating a surface of a golf ball with a solution of ethylene-imine, carbodiimid or the derivatives thereof and then coating it with a paint and a pre-treatment solution comprising ethylene-imine, carbodiimide and the derivatives thereof for coating a golf ball.

3 Claims, No Drawings

METHOD OF COATING A GOLF BALL

FIELD OF THE INVENTION

The present invention relates to a method of coating a golf ball and a pre-treatment solution utilized for the method.

DEFINITION OF THE TERMS

The term "coated golf ball" is a golf ball having a paint layer on the surface of the ball and used herein for distinguishing it from a golf ball which is not coated with a paint.

BACKGROUND OF THE INVENTION

A golf ball is generally served into market in the form of a golf ball coated with a paint for enhancing quality and appearance. The paint layer, however, is required to strongly adhere to the surface of the golf ball, because the coated golf ball receives very strong impact force and friction force. In order to chemically or physically enhance the adhesive force between the golf ball and the paint layer, several methods for treating a golf ball, such as shot blasting, flaming, alcohol washing, corona discharge and plasma treatment are practiced. However, these treatments do not provide a sufficient adhesion force between the golf ball and the paint layer. Therefore, the golf ball is generally treated by the above methods and then coated with another coating layer for imparting adhesive force.

SUMMARY OF THE INVENTION

As the result of studying a method of treating a golf ball for imparting excellent adhesive force between the ball and the paint layer, it has been found that the paint layer strongly adheres to the golf ball if the golf ball is treated with a particular treatment solution containing ethyleneimine, carbodiimide and a derivative thereof. Accordingly, the present invention is to provide a method of coating a golf ball comprising coating a surface of a golf ball with a solution of ethyleneimine, carbodiimide or the derivatives thereof and then coating it with a paint.

The present invention also provides a pretreatment solution for coating a golf ball comprising ethyleneimine, carbodiimide and the derivatives thereof.

DETAILED DESCRIPTION OF THE INVENTION

Ethyleneimine, carbodiimide or the derivative thereof can be employed separately or in combination. Examples of the derivatives of ethylene-imine include 2,2-bishydroxymethylbutanol-tris[3-(1-aziridinyl) propionate], diphenylmethane-bis-4,4'-N,N'-diethyleneurea or the compound represented by the formula:

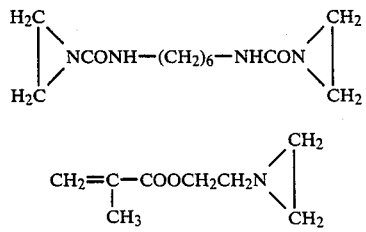

The carbodiimide derivatives are represented by the formula R—N=C=N—R in which R, the same or different, is alkyl or aryl. Examples of the carbodiimido derivatives are 1-ethyl-3-(3'-dimethylaminopropyl) carbodiimide which is preferred, dicyclohexylcarbodiimide, diphenylcarbodiimide, di-paratoluylcarbodiimide and the like. These treatment solutions can be utilized in the form of a concentrated solution, but usually can be utilized as the form of a diluted solution. The solvent employed for dilution include alcohols, such as isopropyl alcohol; aromatic hydrocarbons, such as toluene, xylene and benzen; esters, such as ethyl acetate; water; and the like. The above compound is formulated ranging from 0.05 to 50% by weight, preferably 0.05 to 10% by weight in a dilute solution.

The golf ball may be coated by immersing in the above solution or spray-coated. Any golf ball can be used. Preferred is a golf ball having an ionomer resin cover. The golf ball, if necessary, may be treated with a physical or a chemical treatment such as blasting, flaming, washing with an alcohol, corona discharge or plasma treatment prior to the treatment of the present invention. Such a pretreatment may further enhance adhesive force.

The golf ball can be coated by a conventional method. The paint employed for coating can be either a enamel paint or a clear paint. The paint includes an urethane paint, an epoxy paint and an acryl paint. The urethane paint is preferred.

A carbodiimide and an ethylene-imine are known as a crosslinking agent. Also, it is known that a carbodiimide has a function which protect a paint from hydrolysis (see Journal of Elastomers and Plastics, H. Ulrich, 18, July, 1986). However, it is not disclosed that a carbodiimide or an ethylene-imine is employed for pre-treatment before coating a golf ball to obtain the paint adhesion.

According to the method of the present invention, an adhesion force between a golf ball and a coat layer are enhanced greatly, thus an excellent appearance and a durability for using for a long time are imparted to the golf ball.

EXAMPLES

The following examples illustrate the present invention and should not be construed as a limitation on the scope thereof.

EXAMPLES 1 and 2 AND COMPARATIVE EXAMPLES 1 and 2

The two-piece golf ball which was covered with an ionomer resin cover was treated by blasting and flaming, followed by immersing in a one % by weight ethylene-imine solution in isopropanol for 1 minute and drying at 50° C. for 10 minutes. Then, the golf ball was coated with a urethan clear paint or a urethan enamel paint.

The obtained coated golf ball was evaluated for an initial adhesion and an adhesion after weather exposure. The result is shown in Table 1.

The comparative example was conducted in the same manner with the exception that the golf ball was not immersed in the solution of ethyleneimine. The result is shown in Table 1.

TABLE 1

|  | Example | | Comparative example | |
| --- | --- | --- | --- | --- |
|  | 1 | 2 | 1 | 2 |
| Cover | Ionomer resin | | | |

TABLE 1-continued

|  | Example 1 | Example 2 | Comparative example 1 | Comparative example 2 |
|---|---|---|---|---|
| Ethylene imine pre-treatment | Done | Done | Not done | Not done |
| Primer | Urethane clear | Urethane enamel | Urethane clear | Urethane enamel |
| Initial adhesion[1] | Very good | Very good | Bad | Bad |
| Adhesion after weather exposure[2] | Very good | Very good | Bad | Bad |

[1] After the golf ball was dried, it was immersed in water for 1 day and struck to a board 100 times at a speed of 45 m/sec. A condition of paint adhesion was observed. Very good shows no delamination and bad shows existence of the paint delamination.

[2] After a golf ball was treated in sunshine Weather-O-Meter for 100 hours, it was struck to a board 100 times at a speed of 45 m/sec and a condition of paint adhesion was observed.

EXAMPLES 3 and 4 and COMPARATIVE EXAMPLES 3 and 4

The test was conducted in the same manner as Examples 1 and 2 and Comparative Examples 1 and 2 with the exception that the one % by weight solution of carbodiimide in isopropanol was employed as the pre-treatment solution. The result is shown in table 2.

TABLE 2

|  | Example 3 | Example 4 | Comparative example 3 | Comparative example 4 |
|---|---|---|---|---|
| Cover | Ionomer resin | | | |
| Carbodiimide pre-treatment | Done | Done | Not done | Not done |
| Primer | Urethane clear | Urethane enamel | Urethane clear | Urethane enamel |
| Initial adhesion[1] | Very good | Very good | Bad | Bad |
| Adhesion after weather exposure[2] | Very good | Very good | Bad | Bad |

What is claimed is:

1. A method of coating a golf ball comprising coating a surface of a golf ball with a solution of ethylene-imine, carbodiimide or the derivatives thereof and then coating it with a paint.

2. The method of claim 1 wherein the surface of said golf ball is a cover comprising an ionomer resin.

3. A golf ball obtained according to claim 1.

* * * * *

UNITED STATES PATENT AND TRADEMARK OFFICE
CERTIFICATE OF CORRECTION

PATENT NO. : 4,871,589
DATED : October 3, 1989
INVENTOR(S) : Katsutoshi KITAOH and Akihiko HAMADA It is certified that error appears in the above-identified patent and that said Letters Patent is hereby corrected as shown below:

Column 1, line 21, the term "chemichally" should read --chemically--.
Column 2, line 24, the term "a" should read --an--; line 31, the phrase "has a function which protect" should read --has the function of protecting--; line 34, the term "the" should be deleted; line 39, the phrase "using for" should read --use over--; and line 55, the term "urethan" (both occurrences) should read --urethane--.

Signed and Sealed this

Tenth Day of March, 1992

Attest:

HARRY F. MANBECK, JR.

*Attesting Officer*     *Commissioner of Patents and Trademarks*